US007881451B2

(12) United States Patent
Chang

(10) Patent No.: US 7,881,451 B2
(45) Date of Patent: Feb. 1, 2011

(54) AUTOMATED DIRECTORY ASSISTANCE SYSTEM FOR A HYBRID TDM/VOIP NETWORK

(75) Inventor: Hisao M. Chang, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1195 days.

(21) Appl. No.: 10/848,520

(22) Filed: May 18, 2004

(65) Prior Publication Data

US 2005/0259806 A1 Nov. 24, 2005

(51) Int. Cl.
*H04M 3/42* (2006.01)
(52) U.S. Cl. .............................. 379/218.01; 379/90.01
(58) Field of Classification Search ............ 379/218.01, 379/265.11, 142.15, 88, 213
See application file for complete search history.

(56) References Cited

U.S. PATENT DOCUMENTS 5,987,408 A * 11/1999 Gupta ........................ 704/231
6,735,287 B2 * 5/2004 Vishik et al. ............. 379/88.02
6,958,994 B2 * 10/2005 Zhakov et al. ............... 370/352
7,251,604 B1 * 7/2007 Thenthiruperai ......... 704/270.1
2003/0118159 A1 * 6/2003 Shen et al. ................ 379/88.04
2003/0125958 A1 * 7/2003 Alpdemir et al. ............ 704/275
2004/0032941 A1 * 2/2004 Graham et al. .............. 379/219
2005/0080905 A1 * 4/2005 Dolinar et al. .............. 709/227

* cited by examiner

*Primary Examiner*—Curtis Kuntz
*Assistant Examiner*—Amal Zenati
(74) *Attorney, Agent, or Firm*—Toler Law Group

(57) ABSTRACT

An automated directory assistance platform architecture is provided for at least partial automatic processing of 411 calls from TDM-based telephone networks and from VoIP networks. The architecture includes three layers. One layer is a telephony network interface that accepts information from both TDM and VoIP based DA networks. The telephony layer sequesters the other two layers from the complexities of interacting with different source networks. Another layer is a VoiceXML-based IVR dialog engine that directs information received from the telephony interface. The third layer is an App Server Layer that processes information received from the dialog engine by retrieving information from an internet-accessible database. Calls that cannot be handled completely by automation are handed off to a live operator working in all IP environment.

20 Claims, 1 Drawing Sheet

AUTOMATED DIRECTORY ASSISTANCE SYSTEM FOR A HYBRID TDM/VOIP NETWORK

FIELD OF THE INVENTION

The present invention relates generally to telecommunications systems and more specifically to platform architectures for automated directory assistance.

BACKGROUND OF THE INVENTION

The service providers of public switching telephone networks (PSTN) have been offering 411-type directory assistance (DA) service via live operators for more than a century. An early step toward automated directory assistance (ADA) was the use of store and forward technology to assist live operators. Early ADA systems use various speech compression and silence removal techniques, known as "Store and Forward", to shorten the time a live DA operator handles a call. The caller was asked for a locality by a pre-recorded prompt. The store and forward system stored a compressed version of the caller's response to the prompt, and brought a live operator onto the line. The operator heard a compressed version of the response and then completed the remaining dialog with the caller to provide a unique telephone number.

More recently another form of automated directory assistance has been developed, which uses automated speech recognition (ASR) technology to recognize a locality from the caller's response to a prompt. In a typical system, if the speech recognition is successful, the system asks for the listing, puts an operator on the line, populates the operator's workstation display with the recognized locality, and plays a recorded compressed version of the caller's response to the listing question. The operator then conducts the remaining dialog.

Systems have been developed that attempt to carry the speech recognition through the entire dialog of locality, database listing, clarification, and disambiguation. Recognition success rates have increased but are not 100%. The conventional approach to improving the success rate is to "tune" the system by recording callers' responses and using them to expand the speech recognition capability.

In the event of failed speech recognition, the system defaults to a live operator. Conventional approaches automatically hand off the call to a live operator after a failed attempt at speech recognition. Automatic hand off is described in U.S. Pat. Nos. 4,979,206, 5,479,488, and 5,987,414.

The foregoing ADA technologies and related systems were developed to process a portion or the entire duration of a 411 call from a traditional Time Division Multiplex (TDM)-based circuit switched telephone network. In addition to TDM circuit switched networks, however, there are packet switched networks such as the internet. Packet switching has historically been used for data transmission, but it has recently been enhanced to provide voice transmission. "Voice over IP" (VoIP) is a set of technologies that enables voice to be sent over a packet network. Its usage for messaging is expected to explode in the coming years.

Users communicate using VoIP as easily as they do with today's PBXes and public phone networks. By leveraging the existing data network, companies can save significant amounts of money by using VoIP for toll-bypass. It is thought that VoIP will speed the adoption of unified messaging by transmitting voice, fax and e-mail messages. VoIP is also known as IP telephony.

Over the next several years, companies will deploy VoIP in conjunction with 802.11 wireless LANs, enabling workers to have WLAN-based mobile phones in the office.

Session Initiation Protocol (SIP) is the real-time communication protocol for VoIP. It also supports video and instant-messaging applications. SIP performs basic call-control tasks, such as session set up and tear down and signaling for features such as hold, caller ID and call transferring. Its functions are similar to Signaling System 7 (SS7) in standard telephony and H.323 or Media Gateway Control Protocol in IP telephony.

With SIP, most of the intelligence for call setup and features resides on the SIP device or user agent, such as an IP phone or a PC with voice or instant-messaging software. In contrast, traditional telephony or H.323-based telephony uses a model of intelligent, centralized phone switches with dumb phones.

TDM and VoIP networks are expected to co-exist for some time. An important challenge for providing improved ADA, therefore, is to provide a platform having a telephony layer that is capable of interfacing with both TDM, circuit-switched, networks, as well as VoIP, packet-switched, networks.

Another relevant technology for ADA is VoiceXML. VoiceXML is a markup language for creating voice-user interfaces. It uses speech recognition and/or touchtone (DTMF keypad) for input, and pre-recorded audio and text-to-speech synthesis (TTS) for output. It is based on the World-wide Web Consortium's (W3C's) extensible Markup Language (XML), and leverages the web paradigm for application development and deployment. By having a common language, application developers, platform vendors, and tool providers all can benefit from code portability and reuse.

With VoiceXML, speech recognition application development is greatly simplified by using familiar web infrastructure, including tools and Web servers. Instead of using a PC with a Web browser, any telephone can access VoiceXML applications via a VoiceXML "interpreter" (also known as a "browser") running on a telephony server. Whereas HTML is commonly used for creating graphical Web applications, VoiceXML can be used for voice-enabled Web applications.

VoiceXML is growing in popularity and effectiveness. VoiceXML-based applications are increasing both in number and in features. For example, one carrier's toll-free directory assistance services 200,000,000 calls per year. Another carrier's VoiceXML system lets customers speak a name or phone number to make a phone call as well as use voice commands to access information services such as stock quotes and sports. The General Motors Onstar™ system includes the Virtual Advisor™, a personalized voice portal complete with financial services, traffic, weather, news, sports, entertainment, and e-mail.

In call centers, VoiceXML is providing an attractive alternative to proprietary IVR solutions to automate the more routine transactions. E-trade's customer service and stock trading automated telephone applications, for example, are both written in VoiceXML. VoiceXML-based utilities for standards-based voice solutions include Customer Relationship Management, Human Resources, and Supply Chain Management.

Most developers confirm VoiceXML is at least three times faster in terms of application development compared to traditional IVR. VoiceXML offers reusable and off-the-shelf applications because it is a W3C standard markup. Traditional or proprietary IVR requires a second silo infrastructure from existing Web infrastructure, whereas VoiceXML does not. VoiceXML's easily integrates with existing application server infrastructure. That is, VoiceXML applications run off of the same servers that Web services run, providing a flexible, distributed architecture, rather than on a "big iron" legacy IVR platform.

The present invention provides an ADA platform architecture to accommodate TDM and VoIP networks at the telephony level, to exploit VoiceXML at the database level, and to use VoIP at the call routing level, to provide improved ADA services.

BRIEF DESCRIPTION OF THE DRAWINGS

The present invention is further described in the detailed description that follows, by reference to the noted drawing, by way of non-limiting examples of embodiments of the present invention, in which like reference numerals represent similar parts throughout several views of the drawings, and in which.

DETAILED DESCRIPTION OF THE INVENTION

Figure 1:
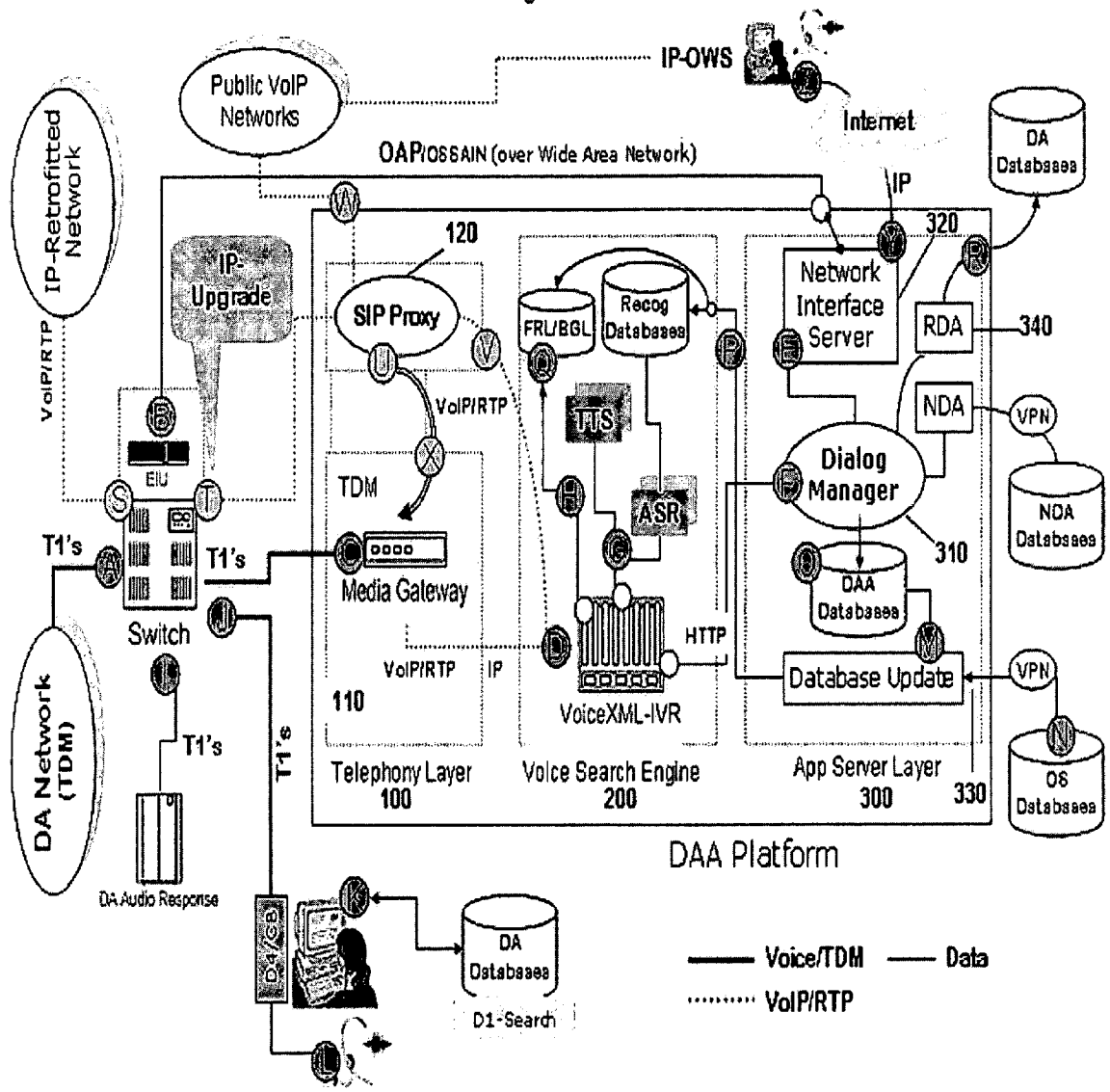
FIG. 1. is a flow chart of a platform architecture of one embodiment of the present invention.

In view of the foregoing, the present invention, through one or more of its various aspects, embodiments and/or specific features or sub-components, is thus intended to bring out one or more of the advantages that will be evident from the description. The present invention is described with frequent reference to Directory Assistance. It is understood, however, that Directory Assistance is merely an example of a specific embodiment of the present invention, which is directed generically to automated voice-activated information retrieval within the scope of the invention. Information retrieval refers to obtaining the requested information and providing the obtained information to the requesting party. The terminology, examples, drawings and embodiments, therefore, are not intended to limit the scope of the invention.

This invention describes an ADA platform architecture that is capable of handling 411 calls from the existing and traditional TDM-based telephone network, as well as that from emerging VoIP networks. In distinction from prior ADA systems or technologies, the platform architecture of the present invention provides multiple network interface components within the telephony layer.

The architecture consists of three platform layers. The first layer, the telephony network interface, insolates the other two layers of the system from working directly with circuit-switched TDM networks. Both TDM and VoIP based DA networks may co-exist for some time, demanding a certain complexity in the interface of the first layer.

The call processing logic and call transfer functions between this telephony layer and the rest of the ADA platform are entirely based on industry standards such as W3C VoiceXML and ITU VoIP/SIP standards. If a live DA operator is required to complete the call, the 3rd layer, the App Server Layer, is thereby able to fully utilize existing web technologies and emerging VoIP technologies to route partially automated calls over the Internet to all IP-based operator workstations (IP-OWS).

The middle layer employs a VoiceXML-based IVR dialog engine that operates in a 100% IP environment.

FIG. 1. illustrates a platform architecture of the ADA system described of the present invention. A 3-layer architecture is provided to interface a hybrid DA network with both TDM-based circuit switched network facilities (T-1s) and VoIP edge points such as Ethernet. Within telephony layer 100, there are two subsystems: Media Gateway 110 and SIP Proxy 120, each capable of processing different types of DA traffic from different networks.

Media gateway 120 handles traditional DA traffic from existing and proprietary DA networks over circuits switched T-1s. At the same time, SIP Proxy 120 allows the ADA system to be configured to accommodate traffic from a packet-switched VoIP connection. SIP Proxy 120 re-directs a call originating from a VoIP network back to a TDM-based DA network after the call has been partially processed by ASR. The system shifts the latter part of the call to an existing bank of operator positions.

The voice search engine layer 200 is based on W3C VoiceXML 2.0 and related standards, and provides automated voice recognition. Unlike existing proprietary voice search engines the VoiceXML-driven voice search engine allows a whole host of new ADA applications to be authored in the standards-based markup language, VoiceXML. Similar to HTML and other XML-based markup languages, VoiceXML separates the user presentation (voice user interface) from the backend business logic. This mid-layer creates new options for a distributed deployment of the ADA system of the present invention. Voice search engine 200 can be physically installed outside a DA service provider's network operating facility, because the entire voice search engine is encapsulated inside of this layer and interfaces with the other platform components using standard IP and/or HTTP protocols.

App Server Layer 300 of the ADA platform makes full use of existing web technologies to eliminate hardware dependency. Dialog Manager 310 inside this layer is based on Java 2 Enterprise Edition (J2EE), an industry standard for developing web-based applications. The platform is easily configured to interface with web-based directories and/or web-based search engines such as Google® or Yahoo®. This capability enables the system's operator to offer a whole host of DA services where the "directory" contains not just telephone numbers but also URL (Universal Resource Locator) addresses for those who have a VoIP telephone.

In the following description of the operation of an exemplary platform of the present invention, circled letters designate the interface points that are either between different components within the platform or between the platform and a DA network. Phrases such as "Circle-X" in the following descriptions correlate to the corresponding symbols in FIG. 1.

Circle-A: In the initial deployment of a platform of the present invention, 411 traffic is routed to the platform through TDM-based T-1 circuits.

Circle-B: Prior to deployment of a platform of the present invention, existing TOPS switches are, if necessary, upgraded to support Open Access Protocol (OAP) by adding necessary hardware components (EIU) to the switches to form an Operator Service Signaling Advanced Intelligent net (OS-SAIN) network. The platform interfaces OSSAIN via EIU using standard Ethernet connections over a Wide Area Network (WAN).

Circle-C: The T-1 connections from the TOPS terminate on a standard media gateway such as Cisco AS5400 Universal Gateway. As shown in FIG. 1, the platform separates the telephony layer from the voice search engine layer. The media gateway between the TDM-based TOPS network and the VoIP-based IVR, the voice search engine and the rest of the platform can be easily reconfigured, without adding any new hardware elements, to handle the additional volume of 411 traffic coming from the VoIP network.

Circle-D: The software-based VoiceXML platform includes the IVR that converses with 411 callers. The media gateway converts the 411 calls into packetized audio streams and initiates a VoIP call to the VoiceXML platform via SIP or H.323. Once the call is setup, the media gateway has an established voice path over LAN using standard Real-Time Transport Protocol (RTP) with the VoiceXML platform. The VoiceXML platform uses, for example, industry standard off-the-shelf hardware servers, preferable running on Linux/Unix-based computer servers.

Circle-E: During the initial call setup, the TOPS may send the necessary session related messages to a Network Interface Server using OAP. The Network Interface Server is a software process running a J2EE-compliant application server such as, for example, IBM's WebSphere® App Server (WAS) or ColdFusion® J2EE MX Server from Macromedia.

Circle-F: Session specific messages may contain information for Dialog manager 310, a software process running on a load-balanced application server cluster with fail-over capability. Based on the information received from the OPA messages, Dialog manager 310 then handles a given call for features such as branding options, language selections, and caller profiles.

All the actions performed so far determines the URL location for the initial VoiceXML document containing the Voice User Interface (VUI) logic. The VoiceXML-IVR platform 200 then fetches this VoiceXML document (or using a cached version if it is not expired) over standard HTTP interface (connecting to Circle-F) from the App Server cluster 300. The VoiceXML 2.0 (or current version) compliant interpreter, a software process running on the VoiceXML platform, parses the VUI logic specified in the initial VoiceXML document and carries on a conversation with the caller.

Circle-G: The VoiceXML-IVR platform accesses various ASR and TTS resources in a client and server architecture. The ASR/TTS resource is typically configured as a pool of ASR/TTS servers running on industry standard computer servers. The traditional N+1 configuration applies to the client/server interface between VoiceXML-IVR nodes and the bank of ASR/TTS servers. ASR/TTS servers running on Linux/Unit-based computer servers.

Circle H: If a DA call is fully automated, at least two embodiments of the present invention are contemplated for audio release. In one embodiment, VoiceXML-IVR subsystem 200 will obtain the matching telephone number from a local FRL/BGL database via Circle-H. Then, the VoiceXML-IVR subsystem will playback the telephone number using either a TTS engine or pre-recorded audio files created specifically for speaking telephone numbers.

Circle-I: In another embodiment for audio release, Dialog manager 310 queries the TOPS to release the number requested using OAP messages and then instructs VoiceXML-IVR subsystem 200 to disconnect the call. In accordance with the second embodiment, the TOPS bridges the call to an available port on an existing DA Audio Response system. The caller then hears the telephone number requested from the external DA Audio Response system. The invention thereby utilizes an existing audio response system.

Circle J: If a DA call is partially automated, Dialog manager 310 instructs Network Interface Server 320 to send proper OAP messages to the TOPS switch. The TOPS then bridges the call to an IWS position via the existing T-1 facility.

Circle-K: Based on these OAP messages, the TOPS switch may instruct IWS to populate one or more data fields on the IWS screen. For example, an OAP message may contain results from a voice search engine on the platform such as locality, top-line name, or other useful information that may be displayable on the IWS screen.

Circle-L: After the bridge, the platform (VoiceXML-IVR) 200 plays an initial introduction tone to the operator indicating that the call is coming from the DAA platform. After the introduction tone, VoiceXML-IVR subsystem 200 may playback a recording from the caller consisting of one or more responses to the prompts from the DAA platform. For instance, a recording may contain two different responses to different system prompts such as "Tulsa" (responding to a system prompt asking for locality information) plus "Saint John Medical Center" (responding to a system prompt asking for a listing). After the playback of the customer recordings, VoiceXML-IVR subsystem 200I plays a special ending tone to signal the operator that the caller is now on line. After the playback of the ending tone, the DAA platform disconnects the port from the bridge. The operator may not hear any caller recordings between the introduction tone and the ending tone. Such cases can occur if callers are timed-out without speaking anything at all.

Circle-M: Database Update module 330 receives the listing data feed from one or more Operator Services databases via VPN or other mechanized electronic data interface (EDI).

Circle-N: An Operator Services database may, for example, be an existing D1-Admin database or other data source derived from electronic white pages. A proper EDI will be specified for Database Update module 330 to receive such a data feed via either a scheduled batch process (for the initial data dump) or in real-time (for emergency update) through API calls.

Circle-O: The platform parses the data feed to create various ADA databases for internal use by the platform.

Circle-P: In addition, Database Update module 330 generates necessary "Recog Databases" used by ASR engine. Recog Databases may contain proper speech recognition grammars. Such grammars are stored either according to W3C-defined Speech Recognition Grammar Specification (SRGX) for dynamic access or as pre-compiled binary files for the underlying ASR engines built into the DAA platform.

Circle-Q: The FRL/BGL database contains the telephone numbers for the fully automated listings of the platform. The database may contain the telephone numbers for a Frequently Requested Listing (FRL). The invention contemplates, however, an intelligent system whereby the FRL database grows to contain other business or government listings (BGL) that can be easily automated.

Circle-R: In the case of a Reverse Directory Assistance (RDA) call, the platform asks the caller to key in (or speak) a 10-digit telephone number for the address information for which the caller is looking. Once a 10-digit telephone number is confirmed, Dialog manager 310 passes the phone number to RDA module 340. RDA module 340 retrieves the listing information associated with the telephone number in real-time.

Once the listing information for the RDA request is received, Dialog manager 310 formats the text information. Formatting the text includes performing such functions as resolving ambiguity ("St." to "Saint" or to "Street" depending upon the context), expanding abbreviations (from "Pl." to "Place", from "Co" to "Company"), and re-arranging the order of words in the listing for easy listening. A VoiceXML form containing the final text, and the prosodic instructions as to how to say the text, passes to VoiceXML-IVR subsystem 200 which then uses a TTS engine to convert audio in real-time and play it back to the RDA caller.

Circle-S: To further improve the network operating efficiency, the invention contemplates a TDM-based TOPS network to support VoIP capability. The TOPS switch that connects to a TOPS-based VoIP network using, for example, a Nortel-based IP-XPM technology.

In the Nortel IP-XPM-based deployment embodiment, the TOPS switch sends the traffic to the platform using VoIP, bypassing Media gateway 110. To support different types of TOPS networks (TDM and VoIP), the platform provides two different entry points on voice paths.

Circle-U and -V: To support multiple network interfaces, the telephony layer of the platform contains SIP Proxy 120 to provide a ubiquitous access address (such as 411@mid-west.sbc.com) to all TOPS switches that support IP-XPM. When a call comes from an IP-XPM-based VoIP network, the TOPS switch will initiate a VoIP call request (such as SIP Invite) to SIP Proxy 120 over a standard IP connection. SIP Proxy 120 then redirects the call to a proper VoiceXML-IVR server 200 with VoIP capability. From that point on, the call is handled exactly as if it has come from a TDM-network, as described above.

Circle-W: The present invention contemplates VoIP services for customers via their own VoIP networks or via other VoIP networks. To provide 411 services to such VoIP customers, the SIP Proxy used by the platform supports VoIP traffic from other VoIP networks.

Circle-X: For 411 calls coming from another TOPS network, the platform provides additional billing capability. In addition, for partially automated calls, the platform re-routes the call back to the TOPS switch along with the information derived from the voice dialog between the caller and the platform. Then, the TOPS sends the call to an IWS position.

Circle-Y: Using standard IP connections, the platform also routes the partially automated calls to an IP-based operator workstation (IP-OWS) over Internet. Such an IP-OWS can be, for example, a simple VoIP-enabled PC with a standard web browser with a broadband ISP (Internet Service Provider) connection using DSL or cable modem technologies. Accordingly, human DA operators may be located anywhere in the world and work from a PC with a broadband IP connection to the platform installed at the DA operator's remote network facility.

Circle-Z: After login, the operator of an IP-OWS is connected to a web site controlled by Dialog manager 310 via a standard web browser. The VoIP client runs on the IP-OWS in an "on-hook" condition, i.e., waiting for a call from the platform. When the call comes in, the call history is embedded in a header associated with an SIP message. The message triggers a pre-fill of various data fields in a web form on the operator's display. The VoIP client answers the call from the platform. The operator hears any recorded utterances from the 411 caller and then talks to the caller. If the requested listing is found via a browser-based search, the IP-OWS will "transfer" the call back to the platform which then completes the call. If the caller wants a call completion, the platform will route the call back through a proper network connection within Telephony Layer. For example, if the called party is defined as an SIP endpoint (VoIP users), the call will be routed back to a VoIP network through Circle-U and Circle-W. If, however, the called party is a Plain Old Telephone Service (POTS) line, it is bridged to an outbound port on the existing TOPS switch.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

I claim:

1. A system to process calls, the system comprising:
   a telephony network interface comprising:
      a first communication path comprising a media gateway including circuitry configured to accept a first call from a time division multiplex (TDM)-based telephone network and to output the first call as a first voice over internet protocol (VoIP) call to a voice search engine via a first private path that excludes any public network; and
      a second communication path distinct from the first communication path, the second communication path including a session initiation protocol (SIP) proxy, the SIP proxy configured to accept a second call from a VoIP network and to output the second call as a second VoIP call to the voice search engine; and
   the voice search engine including a VoiceXML-based interactive-voice-response ("IVR") dialog engine, the voice search engine operative to:
      receive an outputted VoIP call from the telephony network interface, where the outputted VoIP call comprises one of the first VoIP call and the second VoIP call; and
      fetch a VoiceXML document over a hypertext transfer protocol (HTTP) interface in response to receiving the outputted VoIP call, the VoiceXML document containing including voice user interface logic.

2. The system of claim 1, further comprising:
   an application server to provide the fetched VoiceXML document over the HTTP interface.

3. The system of claim 2, wherein the application server routes partially automated calls to an internet-accessible operator workstation.

4. The system of claim 1, wherein the VoiceXML-based IVR dialog engine supports a W3C VoiceXML standard.

5. The system of claim 1, wherein the VoiceXML-based IVR dialog engine is situated at a remote location from a directory assistance (DA) service provider facility.

6. The system of claim 2, wherein the application server comprises a Java 2 Enterprise Edition (J2EE) compliant application server.

7. The system of claim 1, further comprising an interface to a web-based directory or a web-based search engine.

8. The system of claim 7, further comprising an interface to a web-based directory that stores Universal Resource Locator (URL) addresses.

9. The system of claim 1, wherein the first call is processed automatically.

10. The system of claim 1, wherein the VoiceXML-based IVR dialog engine accesses automatic-speech recognition resources and text-to-speech resources.

11. The system of claim 1, wherein the media gateway is configured to convert the first call into a packetized audio stream prior to outputting the first VoIP call.

12. The system of claim 1, wherein the first VoIP call is output to the voice search engine via an H.323 protocol.

13. The system of claim 1, wherein the voice search engine is configured to provide an audio response to one of the first call and the second call, wherein the response is based at least in part on the fetched voiceXML document.

14. The system of claim 1, wherein the voice search engine is further configured to provide directory assistance information obtained from a local frequently requested listing (FRL) database in response to receiving the outputted VoIP call.

15. The system of claim 1, wherein the second call is output as the second VoIP call to the voice search engine via a private path that is internal to the system and that excludes any public network.

16. A method of processing a call, the method comprising:
receiving a call via one of a time division multiplex (TDM) portd a voice over r internet protocol (VoIP) port of an apparatus that includes the TDM input port and the VoIP port, wherein receiving comprises:
    inputting the call to a TDM-based media gateway when the call is received from a TDM network via the TDM port, converting the received call to a packetized audio stream at the TDM-based media gateway, and outputting the packetized audio stream via a first VoIP call from the media gateway to a voice search engine via a first private path that excludes any public network; and
    inputting the call to a session initiation protocol (SIP) proxy via the VoIP port when the call is received from a VoIP network and outputting a second VoIP call, based on the received call, from the SIP proxy to the voice search engine via a second path; and
fetching VoiceXML documents over a hypertext transfer protocol (HTTP) interface in response to receiving one of the first VoIP call and the second VoIP call at the voice search engine, the VoiceXML documents including voice user interface logic.

17. The method claim 16, further comprising:
partially processing one of the first VoIP call and the second VoIP call automatically at the voice search engine; and
routing the partially processed one of the first VoIP call and the second VoIP call to an internet-accessible live operator workstation.

18. The method of claim 17, further comprising:
obtaining information from an Internet-accessible database via the internet-accessible live operator workstation, wherein the information has been requested by one of the first VoIP call and the second VoIP call; and
sending the obtained information to a TDM-based audio response system.

19. The method of claim 16, further comprising:
partially processing a request to receive information, wherein the request is included in the call, wherein the processing is executed automatically;
directing the partially processed request to an internet-accessible, live operator workstation to obtain the information from an internet-accessible database; and
sending the obtained information to a TDM-based audio response system in response to receiving the call.

20. The method of claim 16, wherein the second path excludes any public network.

* * * * *